June 25, 1929.   L. D. SOUBIER   1,718,607
BOTTLE TRANSFER APPARATUS
Filed March 22, 1926   2 Sheets-Sheet 1
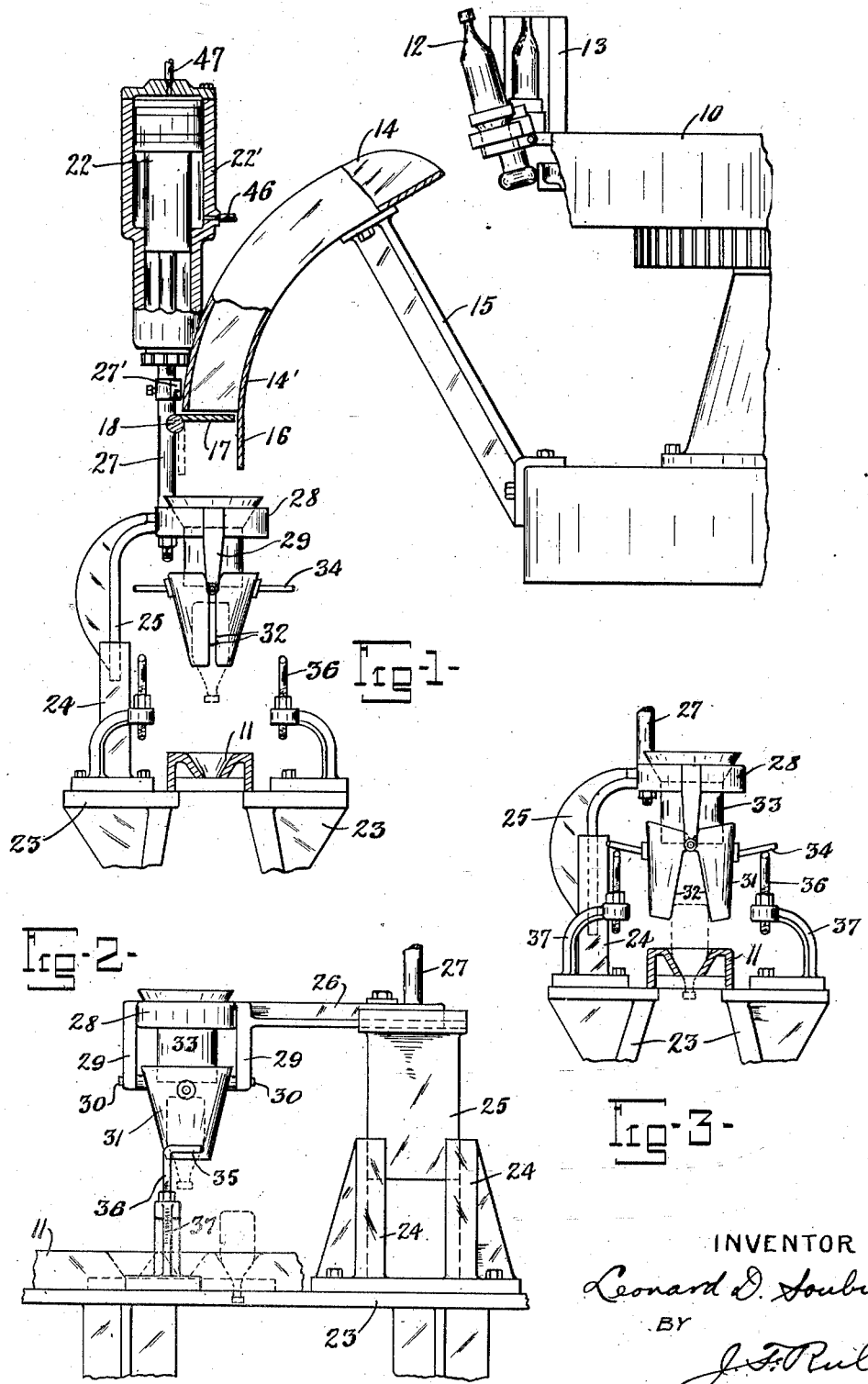
INVENTOR
Leonard D. Soubier
BY
J. F. Rule.
HIS ATTORNEY

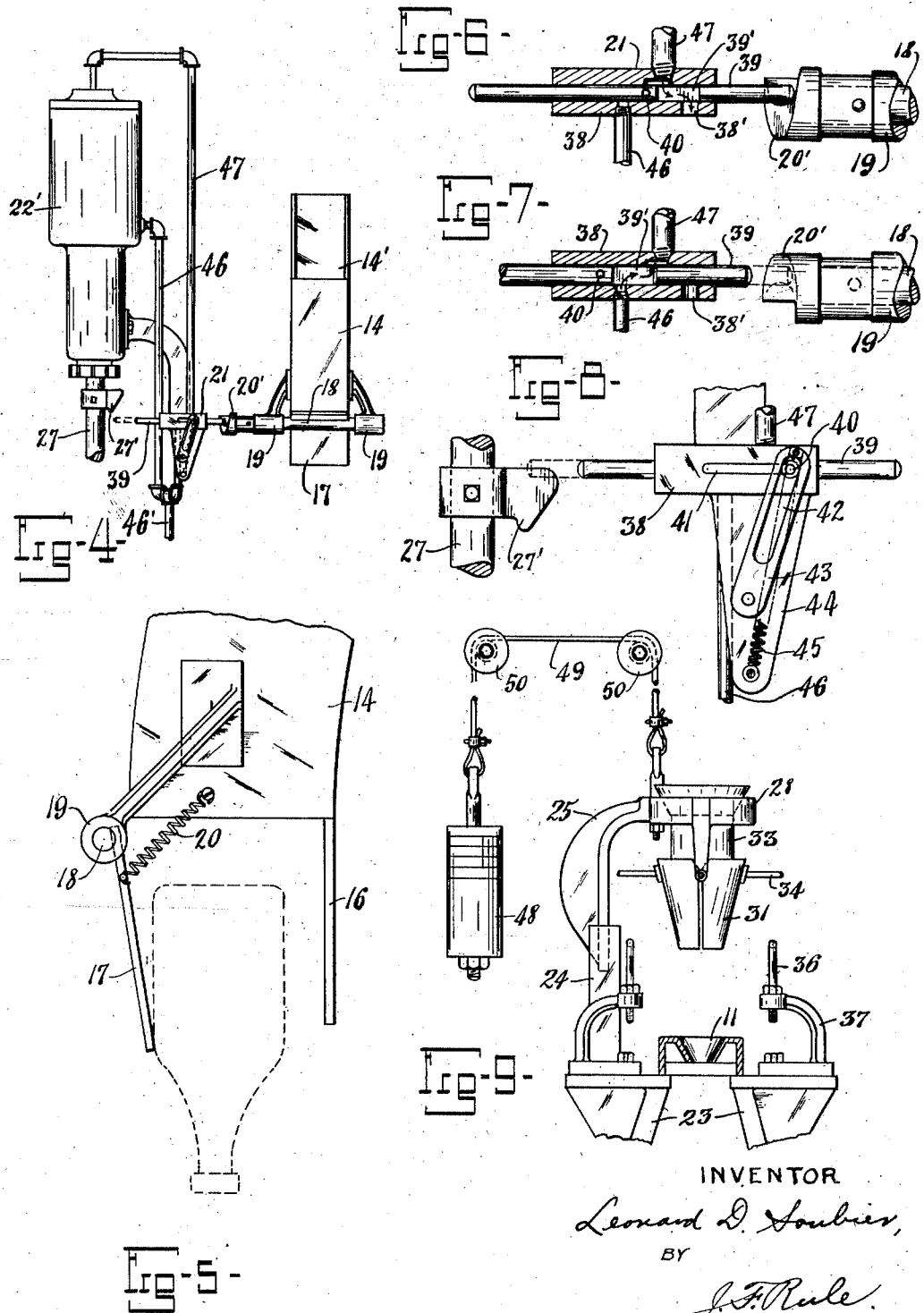

Patented June 25, 1929.

1,718,607

UNITED STATES PATENT OFFICE.

LEONARD D. SOUBIER, OF TOLEDO, OHIO, ASSIGNOR TO THE OWENS BOTTLE COMPANY, OF TOLEDO, OHIO, A CORPORATION OF OHIO.

BOTTLE-TRANSFER APPARATUS.

Application filed March 22, 1926. Serial No. 96,496.

This invention relates to improvements in bottle transfer apparatus, the primary object being to provide means for minimizing injury to bottles or other similar ware during transfer of the latter from a forming machine to an annealing oven or leer by way of a ware carrier element of a leer charging mechanism, it being understood that such ware at this stage of production is hot and in a soft, plastic condition and consequently easily distorted or marred.

A further object is to provide means interposed in the path of travel of ware between a mold carriage or the like, and a ware carrier element for momentarily arresting the transfer movement of ware and then conveying the latter to a point in proximity to and for discharge into the carrier element.

It is also an object of the present invention to provide means for rapidly transferring and at the same time minimizing injury to bottles or the like during transfer from the mold carriage to a ware carrier element, actuation of such means being effected by the bottles or other ware being transferred.

Other objects will be in part obvious and in part pointed out hereinafter.

In the accompanying drawings:

Fig. 1 is an elevation, partly in section, showing the relation of the mold carriage, ware carrier element, and the improved transfer apparatus.

Fig. 2 is a side elevation of the arrester and its adjustable supporting members.

Fig. 3 is an end elevation of the elements shown in Fig. 2, but illustrating the manner in which the clapper sections of the arrester are expanded to discharge the bottle or other ware into the carrier.

Fig. 4 is a side elevation showing the relation of the discharge chute and the arrester reciprocating mechanism.

Fig. 5 is a detail elevation of the lower end of the discharge chute, showing the hinged gate in its lowermost position.

Figs. 6 and 7 are detail views, partly in section, of the air flow control utilized in lowering the arrester.

Fig. 8 is a detail elevation illustrating the manner in which the elements coact to effect return or raising of the arrester to its normal position.

Fig. 9 illustrates a modified form of arrester raising mechanism.

While I have shown in the accompanying drawings a portion of a conventional form of bottle blowing machine comprising a rotary mold carriage 10, and a well known form of intermittently shiftable ware carrier element 11, it is understood that other preferred types may well be employed in connection with this improved transfer apparatus.

In the form of mold carriage illustrated, mechanism (not shown) is employed to intermittently eject the molded bottles or other ware 12 from the mold 13 onto the adjacent end of a discharge chute 14. In this connection, it will be noted that I have shown this chute as comprising an arcuate chamber, closed on all sides throughout a major portion of its length and preferably, though not necessarily, rigidly supported upon the base of the blowing machine by means of an arm or bracket 15.

By reference to Figs. 1 and 5, it will be noted that the wall 14' of the discharge chute 14, is extended downwardly to form a shield or guard 16 which coacts with a hinged gate 17 when the latter is in its lowermost position to insure accurate delivery of bottles or other ware from the chute to an arrester whose purpose and structure will be set forth. The gate 17 has fixed to the edge disposed in parallelism with and remote from the shield 16, a journal 18 whose ends are mounted in bearings 19 formed on the lower ends of arms depending from opposed sides of the chute.

Due to the tension of a pull spring 20, the gate 17 is normally yieldably retained in the full line or closed position shown in Fig. 1, in which position it is adapted to be struck by bottles or the like ware passing through the discharge chute, such engagement with the ware in turn causing oscillation or downward swinging of the gate to the position shown in Fig. 5. Such downward swinging of the gate 17 causes partial rotation of a cam 20' mounted on one end of the aforementioned journal 18, this cam being adapted during its partial rotation to actuate a valve mechanism 21 for the purpose of allowing air or fluid pressure to operate a differential piston 22, which in turn reciprocates an arrester heretofore referred to.

In the formation of what I term an arrester which is adapted to momentarily arrest or check transfer movement of ware to the carrier 11 and thereby minimize injury to the ware without material decrease in efficiency, I rigidly fix to one of a pair of transversely spaced tracks 23, an upstanding bracket 24, which, as shown in Fig. 2, comprises a pair of longitudinally spaced parallel arms having vertical guideways in opposed faces to receive a slide member 25 whose upper end is directed inwardly and adjustably connected to a horizontal, longitudinally extending arm 26. This last named arm 26 is connected in any preferred manner to the lower end of a piston rod 27, the upper end of the latter being in turn fixed to the lower end of the aforementioned differential piston 22. It will be noted that longitudinal adjustability of the horizontal arm 26 permits accurate relative positioning of the several elements.

At the outer end of this horizontal arm 26, I integrally form a ring or collar-like frame 28 having a pair of depending fingers 29 which, as will be noted, are longitudinally aligned with the center of the ware carrier element 11 for a purpose which will be apparent. The lower ends of these fingers 29 are provided with bearings in which are journalled pintles 30 rigidly mounting opposed co-acting clapper sections 31 whose edges 32 are normally disposed in proximity to each other and in longitudinal alignment with the ware carrier 11. In this connection, it will be noted that when clapper sections are in normal positions, a substantially frusto-conical unit is formed, and that the enlarged upper end of the complete unit extends slightly above the discharge end of a funnel 33 which is mounted in the aforementioned frame 28. This frusto-conical unit serves to arrest transfer of ware to the carrier element in an obvious manner.

With assumption of the dotted line position by the ware as shown in Fig. 1, the arrester, including the funnel 33 and clapper sections 31, move downwardly as a unit to the position shown in Fig. 3, and in order that discharge of the bottle or other ware into the vertically aligned pocket of the carrier element 11 may be effected, I mount upon each clapper section 31, a finger 34 which extends laterally with respect to the path of travel of the carrier element.

As will be noted by reference to Fig. 3, these fingers 34 contact with horizontally disposed portions 35 (Fig. 2) of stops 36 at a predetermined elevation, and by reason of this action the clapper sections are separated, thereby ejecting the ware to permit the latter to resume its independent travel to the carrier. Preferably, these stops 36 are in the form of substantially inverted L shaped rods whose lower ends are threaded for vertical adjustment in brackets 37, and are held at any desired point by lock nuts or other suitable elements. By reason of the adjustability of these stops, the point of ejectment of the ware from the arrester may be readily varied and different sized ware may be accommodated.

While other forms of valve mechanism may be employed, I preferably mount upon an arm depending from a cylinder 22', a valve comprising a horizontally disposed body 38 which is arranged adjacent the cam 20 and spaced from the axis of the journal 18 to a degree such as will permit partial rotation of the cam to effect longitudinal shifting of the valve 39. This valve 39 extends beyond the opposite ends of the body 38 and carries a cross pin 40, which slides freely in a slot 41 formed in the body 38 and in a longitudinal slot 42 formed in a link 43. As will be noted by reference to Fig. 8, this link 43 is pivoted at its lower end to a depending arm 44 carried by housing or body 38. A coil pull spring 45 interconnects the upper end of the link 43 and the lower end of said depending arm 44, and is designed to effect a quick snap movement of the valve 39 from one position to the other with passing of dead center by the link.

Air conduits 46 and 47 lead from opposite sides of the valve body or housing 38 to lower and upper ends respectively of the cylinder 22'. A constant air pressure of a predetermined degree is exerted against the lower end of the piston 22 from the inlet 46' by way of the aforementioned conduit 46, in order that the arrester may be normally disposed in its uppermost position as shown in Figure 1.

With shifting of the valve 39 to the position shown in Fig. 7, the port 39' creates communication between the conduits 46 and 47, thereby providing air pressure in the upper end of the cylinder to a degree corresponding to that in the lower end. Under these conditions, and due to the variance in the areas of the opposite ends of the piston 22, downward movement of the piston, piston rod and the arrester, will be effected. At a predetermined point in the downward movement of the piston rod 27, a cam 27' carried by the rod will strike the adjacent end of the valve 39 and by reason of its coaction with the forementioned spring 45, will effect positive quick return of the valve mechanism to the position shown in full lines in Fig. 8, such positioning in turn causing upward movement of the arrester to its normal position as illustrated in Fig. 1. With positioning of the valve 39 as shown in Fig. 6, communication between the upper end of the cylinder and atmosphere is effected by way of the pipe 47, and exhaust port 38'.

The operation of the apparatus may be stated as follows—

Assuming the elements to be relatively disposed as shown in Fig. 1, a bottle 12 or other ware is ejected from the mold 13 and passes neck first through the discharge chute 14 and strikes the hinged gate 17. Due to the weight of the bottle, the hinged gate is swung down and in turn partially rotates the cam 20 to effect longitudinal shifting of the valve 39 to a position in which air pressure will cause downward movement of the piston and piston rod with the arrester. Just prior to the initial downward movement of the piston and parts just mentioned, the bottle or other ware has reached the two clapper sections so that there is a momentary arrest or check of the transfer movement of the ware, immediately following which, the arrester quickly moves with the ware to the lowermost position as shown in Fig. 3. In movement to this last named position, the stops 36 perform the function of separating the clapper sections 31 to allow ejection of the ware into one of the pockets of a carrier element. Due to the checking of the transfer movement of the bottle or other ware as above described, it is obvious that the shock ordinarily imparted to the ware because of the normal uninterrupted descent, will be materially reduced and consequently the liability of injury will be minimized. Also, because of the quick action of the several elements and harmony of operation, efficiency is in no degree hampered.

In a modified form of apparatus as illustrated in Fig. 9, I eliminate the use of air pressure in the reciprocation of the arrester and substitute in lieu thereof a counterbalancing weight 48 which is connected to the arrester by means of a flexible element such as a cable 49 trained over pulleys or sheaves 50. This counterbalancing weight 48 normally holds the arrester in its uppermost position, but with entry of a bottle or other ware into the arrester, will allow the latter to move downwardly with and discharge the article into the ware carrier as in the preferred form.

Modifications of this invention may be resorted to within the spirit and scope of the appended claims.

What I claim is:

1. The combination of a ware forming machine, a traveling ware carrier element, a chute for directing the initial movement of ware discharged from the machine, a reciprocable frame between the chute and said carrier element, a pair of coacting clapper sections pivoted to and depending from said frame to receive and momentarily check the movement of ware discharged from the chute, means for lowering said frame and clapper sections with the ware, fingers projecting laterally from the clapper sections and transversely of the path of travel of the carrier element, upstanding brackets arranged at transversely aligned points with respect to the path of travel of the ware carrier element, and stops vertically adjustably mounted in the brackets and engageable with the fingers to effect separation of the clapper sections at a predetermined elevation and discharge of ware into the carrier element.

2. The combination of a ware forming machine, a ware carrier element, a chute for directing the initial movement of ware discharged from the machine, a reciprocable arrester arranged between the chute and carrier element to catch and convey ware from a point below the chute to a point in proximity to the carrier element, means for discharging ware from the arrester to said element, pneumatic means for reciprocating the arrester, and a control for said pneumatic means arranged in the path of travel of the arrester and actuated by the latter.

3. In a transfer apparatus of the character described, a chute for directing the initial movement of ware to a leer carrier element, an open frame disposed horizontally at a point spaced below the discharge end of said chute, a depending funnel arranged in said frame, a pair of coacting clapper sections pivoted to and depending from said frame, pneumatic means for raising and lowering said frame, funnel, and clapper sections as a unit, a control device for the pneumatic means, said control device being arranged between the lower end of the chute and said frame and operable by contact with ware passing through the frame to the clapper sections, and means for effecting separation of the clapper sections at a predetermined point to discharge ware into the carrier element.

4. Means for checking travel speed of an article being transferred between two points by gravity, said means including a frame, a funnel mounted in the frame and axially aligned with the transfer path of the article, coacting clapper sections pivoted to the frame and depending below the funnel to hold an article, pneumatic means for moving the funnel, clapper sections and article as a unit to a point in proximity to one end of the transfer path, and means for separating the clapper sections at said point to discharge the article.

5. In a transfer apparatus of the character described, an arrester arranged in an article transfer path to check movement of ware and then move with the ware a predetermined degree, pneumatic means providing positive reciprocation of the arrester, and a ware actuated cam causing operation of the pneumatic means for initiating the downward movement of the arrester.

6. In a transfer apparatus of the character described, a chute, a hinged gate extending transversely across the lower end of the chute, an arrester arranged below the gate to check travel of an article discharged from said chute and move with the article a predetermined degree whereat the latter is released, mechanism for reciprocating the arrester, and cam controlled means for reversing the reciprocating mechanism, said gate being adapted to actuate at least one cam.

7. The combination with means for discharging an article and causing it to descend by gravity, of an arresting device in the path of the article shaped to temporarily hold said article, pneumatic means to cause said holding device to move downward with the article to a predetermined position, means to automatically actuate said holding device to release the article at said position and permit it to drop by gravity from the holding device, and cam controlled means to actuate the pneumatic means causing upward movement of the holding device.

8. In an article transfer apparatus, the combination of an article holding device, means to direct an article and permit it to drop by gravity to said holding device, pneumatic means controlled by the movement of said article to initiate a downward movement of the holding device and permit it to descend with the article a predetermined distance, and means to actuate the holding device and release the article therefrom.

9. In an article transfer apparatus, the combination of a pair of pivotally connected clappers, a support therefor, means to hold said clappers in an article supporting position, means to deliver an article to said clappers, pneumatic means controlled by said article to cause a downward movement of the clappers and their support, and automatic means actuated by said downward movement to release the clappers and permit the article to drop by gravity therefrom.

10. The combination of a fluid operated motor comprising a piston having an up and down movement, an article holder connected to said piston, means for discharging an article and causing it to drop by gravity to said holder, and a valve controlling said motor and actuated by the descent of the article to the holder to effect a downward movement of the piston and thereby carry said holder and article downward.

11. The combination of a fluid operated motor comprising a piston having an up and down movement, an article holder connected to said piston, means for discharging an article and causing it to drop by gravity to said holder, a valve controlling said motor and actuated by the descent of the article to the holder to effect a downward movement of the piston and thereby carry said holder and article downward, means for actuating said holder to release the article as the piston completes its descent, and valve actuating means automatically operated as the piston completes its downward movement to reverse the motor and return said carrier.

12. The combination of a machine operable to deliver articles seriatim and permit them to drop by gravity, an article holder to receive said articles, article actuated pneumatic means to cause said holder to descend a predetermined distance after the article is received therein, discharge said article and return to its initial position ready to receive the next succeeding article.

13. In an article transfer apparatus, the combination of an article holding device, means to direct an article and permit it to drop by gravity to said holding device, means actuated by the movement of said article before it reaches said holding device to initiate a downward movement of the holding device and permit it to descend with the article a predetermined distance, and means for causing release of the article from the holding device.

14. In an article transfer apparatus, the combination of a pair of clappers, a support therefor, means to hold the clappers in an article supporting position on their support, means to cause an article to move downward by gravity to a position in which it is held by the clappers, means actuated by said article during said downward movement before it reaches said position to initiate a downward movement of the clappers and their support, and automatic means actuated by the downward movement of the clappers and their support to release the clappers and permit the article to drop by gravity therefrom.

15. The combination of a fluid operated motor comprising a piston having an up and down movement, an article holder connected to the piston, means for discharging an article and causing it to move downward by gravity to the holder, and a valve controlling said motor and actuated by said article during its descent before it reaches the holder, to effect a downward movement of the piston and thereby carry said holder and article downward.

16. The combination of a fluid operated motor comprising a piston having an up and down movement, an article holder connected to said piston, and means for discharging an article and causing it to move downward by gravity to said holder, a valve controlling said motor and actuated by the article during its descent before it has reached the holder to connect said motor with a fluid pressure supply and thereby cause the piston to move downward and carry with it said holder and article, means for actuating said holder to release the article as the piston completes its descent, and valve actuating means automatically operated as the piston completes its descent to reverse the motor and return said holder.

17. The combination of a chute, means for delivering an article to the chute and causing it to move down the chute by gravity, a holder below the chute to receive the article, a prime mover operable to move the holder downward with the article therein, and means actuated by the article during its descent through the chute to initiate the operation of said prime mover before the article reaches the holder.

18. The combination of a chute, means for delivering an article to the chute and causing it to move down the chute by gravity, a holder below the chute to receive the article, a prime mover operable to move the holder downward with the article therein, means actuated by the article during its descent through the chute to initiate the operation of said prime mover before the article reaches the holder, automatic means to actuate the holder to release the article when the holder has completed its downward movement, and automatic means for reversing the prime mover and causing it to return the holder to its starting position after said article has been released.

19. The combination of a chute, a machine for delivering articles seriatim to the chute and causing them to move downward through the chute by gravity, a holder beneath the chute, a motor comprising a vertically moving piston rod and piston, said holder being connected to the piston rod for up and down movement therewith, a valve controlling said motor, means actuated by said articles during their descent through the chute and before the articles have reached the holder, for actuating said valve and thereby initiating a downward movement of the piston rod and said holder, means actuated by the downward movement of said holder for causing the latter to release the articles, and means for reversing the motor and causing return movement of the holder.

Signed at Toledo, in the county of Lucas and State of Ohio, this 19th day of March, 1926.

LEONARD D. SOUBIER.